US010829251B2

(12) United States Patent
Taguchi et al.

(10) Patent No.: US 10,829,251 B2
(45) Date of Patent: Nov. 10, 2020

(54) INSPECTION DEVICE AND PTP PACKAGING MACHINE

(71) Applicant: CKD Corporation, Aichi (JP)

(72) Inventors: Yukihiro Taguchi, Aichi (JP); Tadashi Inoguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 9 days.

(21) Appl. No.: 16/431,895

(22) Filed: Jun. 5, 2019

(65) Prior Publication Data

US 2019/0283910 A1 Sep. 19, 2019

Related U.S. Application Data

(63) Continuation of application No. PCT/JP2017/021812, filed on Jun. 13, 2017.

(30) Foreign Application Priority Data

Dec. 8, 2016 (JP) .................................. 2016-238322

(51) Int. Cl.
*B65B 9/04* (2006.01)
*B65B 57/02* (2006.01)
(Continued)

(52) U.S. Cl.
CPC .............. *B65B 9/045* (2013.01); *B65B 9/04* (2013.01); *B65B 57/00* (2013.01); *B65B 57/02* (2013.01);
(Continued)

(58) Field of Classification Search
CPC ........... B65B 9/045; B65B 57/00; B65B 9/04; B65B 57/02; B65B 57/10; G01N 21/85;
(Continued)

(56) References Cited

U.S. PATENT DOCUMENTS 8,027,527 B2 * 9/2011 Shibuya .................. G06T 7/001
382/141
9,683,943 B2 * 6/2017 Ando ................. G01N 21/8851
(Continued)

FOREIGN PATENT DOCUMENTS

JP  2000163565 A   6/2000
JP  2004321458 A  11/2004
(Continued)

OTHER PUBLICATIONS

International Preliminary Report on Patentability issued in corresponding International Application No. PCT/JP2017/021812, dated Jun. 11, 2019, with English translation (14 pages).
(Continued)

*Primary Examiner* — Nam V Nguyen
(74) *Attorney, Agent, or Firm* — Osha Liang LLP (57) ABSTRACT

An inspection device for inspecting an inspection object of a PTP sheet including a pocket portion formed in a container film, and a cover film mounted to the container film to close the pocket portion, or a portion of a PTP film forming the PTP sheet, includes: an irradiator that irradiates the inspection object with a predetermined light; an imaging device that takes an inspection image of the irradiated inspection object and a peripheral portion of the inspection object; and a processor that: determines whether the inspection object is defective or non-defective based on inspection image data of the inspection object taken from the inspection image. The inspection image data includes data of respective pixels corresponding to an inspection target area subjected to the defective/non-defective determination, and data of respective pixels corresponding to a non-inspection target area that excludes the inspection target area.

10 Claims, 7 Drawing Sheets

(51) Int. Cl.
*B65B 57/10* (2006.01)
*G01N 21/84* (2006.01)
*G01N 21/85* (2006.01)
*B65B 57/00* (2006.01)
*G01N 21/892* (2006.01)
*G01N 21/27* (2006.01)
*G01N 21/359* (2014.01)

(52) U.S. Cl.
CPC ............. *B65B 57/10* (2013.01); *G01N 21/84* (2013.01); *G01N 21/85* (2013.01); *G01N 21/892* (2013.01); *G01N 21/27* (2013.01); *G01N 21/359* (2013.01)

(58) Field of Classification Search
CPC ...... G01N 21/892; G01N 21/84; G01N 21/27; G01N 21/359; G01N 2021/8887; G01N 21/8851; G01N 21/9508
USPC ......... 340/3.1, 3.43, 3.44; 345/423; 382/149
See application file for complete search history.

(56) References Cited

U.S. PATENT DOCUMENTS

| | | | |
|---|---|---|---|
| 10,169,857 B2 * | 1/2019 | Imakoga | G06T 7/0008 |
| 2002/0054703 A1 * | 5/2002 | Hiroi | G03F 1/86 |
| | | | 382/149 |
| 2004/0213444 A1 * | 10/2004 | Yamamichi | G06T 19/00 |
| | | | 382/128 |
| 2005/0205781 A1 * | 9/2005 | Kimba | H01J 37/222 |
| | | | 250/311 |
| 2006/0056676 A1 * | 3/2006 | Takahashi | G06T 7/0004 |
| | | | 382/145 |
| 2006/0083420 A1 * | 4/2006 | Kawaguchi | G06T 5/40 |
| | | | 382/149 |
| 2012/0201448 A1 * | 8/2012 | Nammoto | G06T 7/001 |
| | | | 382/153 |
| 2014/0212006 A1 | 7/2014 | Zhao et al. | |
| 2015/0193900 A1 | 7/2015 | Lau et al. | |
| 2017/0004360 A1 * | 1/2017 | Tanaka | H04N 1/00005 |

FOREIGN PATENT DOCUMENTS

| | | |
|---|---|---|
| JP | 2006219178 A | 8/2006 |
| JP | 2011101138 A | 5/2011 |
| JP | 2014137281 A | 7/2014 |
| JP | 2015200595 A | 11/2015 |

OTHER PUBLICATIONS

International Search Report issued in corresponding International Application No. PCT/JP2017/021812, dated Aug. 29, 2017, with translation thereof (5 pages).

Notice of Reasons for Refusal in corresponding Japanese Patent Application No. 2016-238322, dated Oct. 17, 2017, with translation thereof (4 pages).

* cited by examiner

INSPECTION DEVICE AND PTP PACKAGING MACHINE

BACKGROUND

Technical Field

The present invention relates to an inspection device used to inspect a Press-Through-Pack (PTP) sheet or a portion of a PTP film forming a PTP sheet, as well as to a PTP packaging machine including the inspection device.

Description of Related Art

The PTP sheet includes a container film that has pocket portions filled with contents such as tablets or capsules and a cover film that is mounted to the container film such as to seal openings of the pocket portions.

The PTP sheet is manufactured by a PTP packaging machine. The PTP packaging machine includes a pocket portion forming unit configured to form pocket portions in a strip-like container film; a filling unit configured to fill contents into the pocket portions; a sealing unit configured to mount a cover film to the container film and thereby obtain a strip-like PTP film; and a sheet punching unit configured to punch out the PTP film in the unit of sheets and thereby provide PTP sheets.

In a manufacturing process of the PTP sheet, an inspection device is provided along a conveyance path of the container film. The inspection device conducts an inspection of an inspection object that is a PTP sheet or a portion eventually forming the PTP sheet (for example, the contents and the container film). The inspection device includes an irradiator configured to irradiate the inspection object with light; an imaging unit configured to take an image of the inspection object irradiated with the light; and a quality judgment unit. The quality judgment unit determines whether the inspection object is defective or non-defective, based on inspection image data taken by the imaging unit. The inspection image data denotes data of a taken image of the inspection object and the like (inspection image). The inspection image data includes data with regard to respective pixels of the inspection image (for example, luminance data). The quality judgment unit detects the presence or the absence of any defect based on this data with regard to the respective pixels, so as to determine whether the inspection object is defective or non-defective.

In the case of an inspection that provides defective judgment, a recently proposed technique correlates inspection image data with regard to an inspection object determined as defective to information regarding the inspection (attribute information), for example, inspection items and inspection conditions of the defective judgment and the date and the time of the inspection, and then stores the inspection image data correlated to the attribute information (as described in, for example, Patent Literature 1).

In the process of correlating the inspection image data to the attribute information and storing the inspection image data correlated to the attribute information, there is generally a need to store the inspection image data and the attribute information in separate files and separately provide data or a process for correlating the inspection image data to the attribute information. This, however, significantly increases the number of files relating to the inspection image data and the attribute information. This configuration is thus likely to complicate data management and increase the processing load.

One proposed technique for the purpose of simplifying the data management and reducing the processing load takes advantage of a technique of embedding two-dimensional code information into corresponding pixels of image data (data with regard to pixels) (as described in, for example, Patent Literature 2), so as to embed attribute information into data of respective pixels included in inspection image data and thereby collectively provide the inspection image data and the attribute information in the form of one file.

PATENT LITERATURE

Patent Literature 1: JP 2015-200595A
Patent Literature 2: JP 2011-101138A

Simply embedding attribute information into data of respective pixels included in the inspection image data, however, causes a change in data of the respective pixels included in the inspection image data. The change in data of the respective pixels is likely to affect an inspection or is likely to cause mismatching of the results of the inspection with the inspection image data.

One possible measure writes the attribute information into header information of the inspection image data, so as to cause the attribute information to be included in the inspection image data. With a view to processing inspection image data (for example, displaying or editing an image) by using a general image processing software, there is a need to create inspection image data according to a fixed format. Writing the attribute information into the header information is, however, likely to cause a trouble in the processing of the inspection image data by using the general image processing software.

SUMMARY

An inspection device of one or more embodiments prevents an inspection from being affected, that allows for processing using a general image processing software, that enables attribute information to be included in inspection image data, and that simplifies data management and reduces the processing load, as well as a PTP packaging machine.

Functions and advantageous effects that are characteristic of one or more embodiments are also described as appropriate.

According to one or more embodiments, there is provided an inspection device configured to conduct an inspection of an inspection object that is a PTP sheet or a portion eventually forming the PTP sheet in a manufacturing process of the PTP sheet configured such that a content is contained in a pocket portion formed in a container film and a cover film is mounted to the container film such as to close the pocket portion. This inspection device comprises an irradiator configured to irradiate at least the inspection object with predetermined light; an imaging unit configured to take an image of the inspection object that is irradiated with the light emitted from the irradiator, and a peripheral portion thereof a quality judgment unit configured to determine whether the inspection object is defective or non-defective, based on inspection image data that is data of an inspection image with regard to the inspection object taken by the imaging unit, wherein the inspection image data includes data of respective pixels corresponding to an inspection target area that is an object of determination by the quality judgment unit and data of respective pixels corresponding to a non-inspection target area that is an area other than the inspection target area; and an attribute information adding unit configured to convert at least part of the data of the respective pixels corresponding to the non-inspection target area into attribute information relating to an inspection.

The "attribute information" includes, for example, the type of an inspection conducted by the inspection device, the date and time of the inspection, a sequential number of the PTP sheet or the content (number indicating the sequence of imaging), information indicating color or monochromatic of the inspection image data, information regarding results of the inspection, information regarding various corrections, such as position follow-up information of a sheet portion (portion of the container film or the like that eventually forms the PTP sheet) (correction amount of position misalignment of the sheet portion) and a correction amount of brightness, position information of the content in the sheet portion, information regarding control of the imaging unit (for example, a gain), information required for reinspection (for example, a reference value used in a binarization process), and information regarding types of the content, the container film and the like.

The configuration of one or more embodiments enables the attribute information to be included in the inspection image data, so that the inspection image data and the attribute information are collectively provided in the form of one file. This configuration simplifies data management and reduces the processing load.

The configuration of one or more embodiments causes data of respective pixels (for example, luminance data) corresponding to the non-inspection target area out of the inspection image data to be converted into the attribute information. The non-inspection target area is not an object of determination by the quality judgment unit. Accordingly, conversion of data of pixels corresponding to this non-inspection target area neither affects an inspection nor causes mismatching of the results of the inspection with the inspection image data. Furthermore, the object of conversion is not header information but data of respective pixels or more specifically main body data of the inspection image data. This configuration enables the inspection image data to be processed by using a general image processing software.

In the inspection device of one or more embodiments, the inspection image may have a rectangular shape. The inspection target area of the inspection image may have a rectangular shape with rounded corners. The non-inspection target area of the inspection image may be provided at four corners of the inspection image to be located outside of the rounded corners of the inspection target area. The attribute information adding unit may convert at least part of the data of the respective pixels corresponding to the non-inspection target area located at the four corners of the inspection image, into the attribute information.

The PTP sheet often has a rectangular shape with rounded corners in planar view. Accordingly, the inspection target area is often formed in a rectangular shape with rounded corners.

The inspection image generally has a rectangular shape. Accordingly, a relatively wide non-inspection target area is often formed at four corners of the inspection image to be located outside of the corner of the inspection target area.

The configuration of one or more embodiments takes advantage of the foregoing to convert data of pixels with regard to the non-inspection target area located at four corners of the inspection image, into the attribute information. This configuration reliably provides a storage area for storing attribute information at a fixed position in the inspection image data. For example, preset certain pixel data corresponding to the four corners of the inspection image can thus be specified as an area where attribute information is written. This configuration enables the area where attribute information is written to be set without specifically taking account of a range occupied by the inspection target area. This configuration also enables a process of reading attribute information from a preset certain area where attribute information is written to be employed as the process of reading the attribute information. This configuration simplifies, for example, processes involved in writing and reading the attribute information and thereby effectively reduces the processing load.

The inspection device of one or more embodiments may further comprise a check information adding unit configured to convert at least part of the data of the respective pixels corresponding to the non-inspection target area into check information that is used to check for an error in data of respective pixels included in the inspection image data.

The configuration of one or more embodiments uses the check information to further assure the reliability of information with regard to the inspection image data. As a result, this configuration enhances the reliability of the inspection.

This configuration converts data of pixels with regard to the non-inspection target area into the check information. Accordingly, this configuration does not cause such a problem as the inspection being affected by conversion into the check information or mismatching of the results of the inspection with the inspection image data.

In the inspection device of one or more embodiments, the inspection image may have a rectangular shape. The non-inspection target area of the inspection image may be an area that is located at an edge of the inspection image and that is extended throughout at least one of a height direction and a width direction of the inspection image. The check information adding unit may be configured to perform at least one of conversion of data of each of pixels included in one column corresponding to the non-inspection target area into the check information that is used to check for an error of data in each of other pixels located in an identical line with the each of the pixels when the non-inspection target area is extended throughout the height direction, and conversion of data of each of pixels included in one line corresponding to the non-inspection target area into the check information that is used to check for an error of data in each of other pixels located in an identical column with the each of the pixels when the non-inspection target area is extended throughout the width direction.

The configuration of one or more embodiments converts data of each of pixels included in one line or one column corresponding to the non-inspection target area, into the check information that is used to check for an error in data in an identical column or in an identical line with the each of the pixels. This configuration enables data of respective pixels to be checked in the unit of each line or in the unit of each column. This configuration further assures the reliability of information with regard to the inspection image data and further enhances the reliability of the inspection.

According to one or more embodiments, there is provided a PTP packaging machine comprising the inspection device described above.

The configuration of one or more embodiments basically has similar functions and advantageous effects to those of the embodiments described above.

DETAILED DESCRIPTION

The following description describes embodiments of the present invention with reference to drawings.

Figure 1:
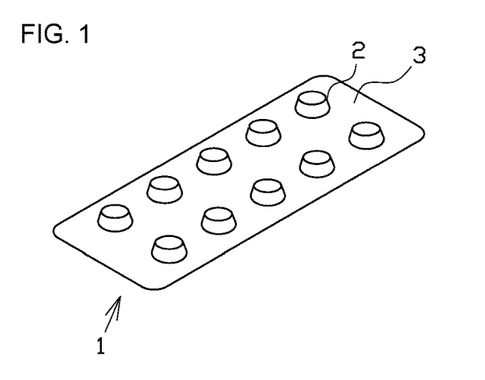
FIG. 1 is a perspective view illustrating a PTP sheet.
Figure 2:
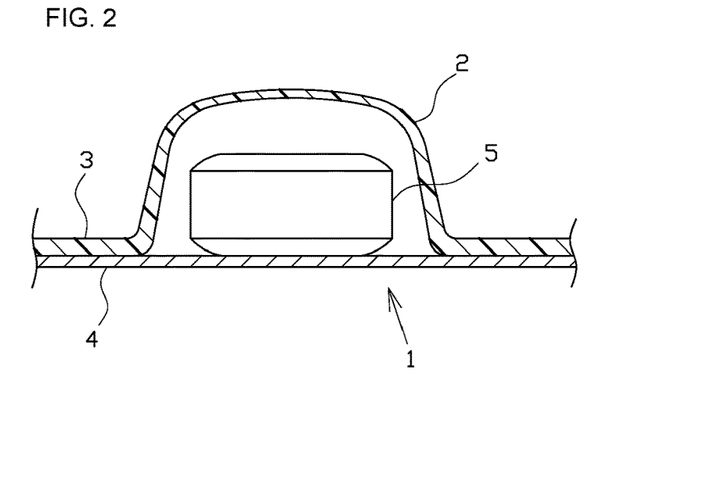
FIG. 2 is a partly broken enlarged front view illustrating the PTP sheet.

A Press-Through-Pack (PTP) sheet 1 is described first. As shown in FIG. 1 and FIG. 2, the PTP sheet 1 includes a container film 3 provided with a plurality of pocket portions 2, and a cover film 4 mounted to the container film 3 such as to close the respective pocket portions 2.

The container film 3 is made of a relatively hard transparent or translucent thermoplastic resin material having a predetermined rigidity, such as PP (polypropylene) or PVC (polyvinyl chloride). The cover film 4 is, on the other hand, made of an opaque material (for example, aluminum foil) with a sealant that is made from, for example, a polyester resin and that is applied on a surface thereof.

The PTP sheet 1 is formed in a rectangular shape with rounded corners and has two arrays of pockets formed along a sheet short direction. Each pocket array is comprised of five pocket portions 2 that are arrayed along a sheet longitudinal direction. Accordingly, a total of ten pocket portions 2 are formed. One tablet 5 is placed as a content in each of the pocket portions 2.

Figure 3:
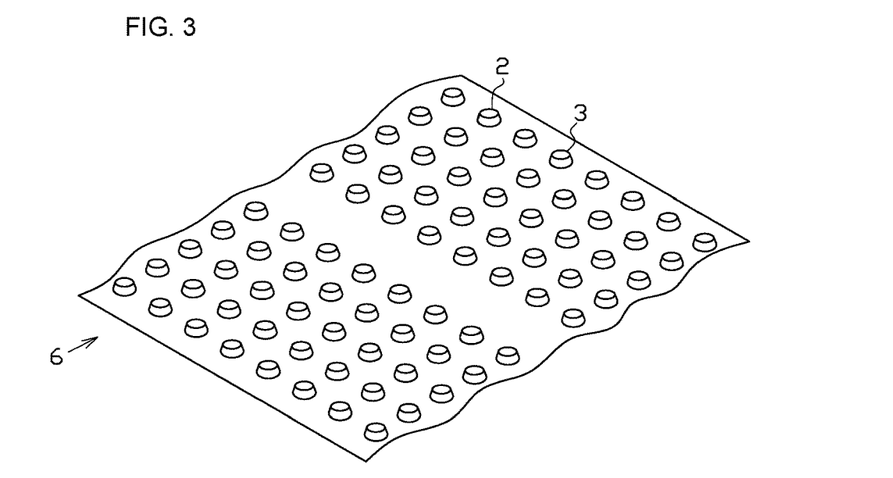
FIG. 3 is a perspective view illustrating a PTP film.

The PTP sheet 1 is manufactured by punching sheets from a strip-shaped PTP film 6 (shown in FIG. 3) that is comprised of the strip-shaped container film 3 and the strip-shaped cover film 4.

The following describes the general configuration of a PTP packaging machine 11 used to manufacture the PTP sheet 1 described above, with reference to FIG. 4.

Figure 4:
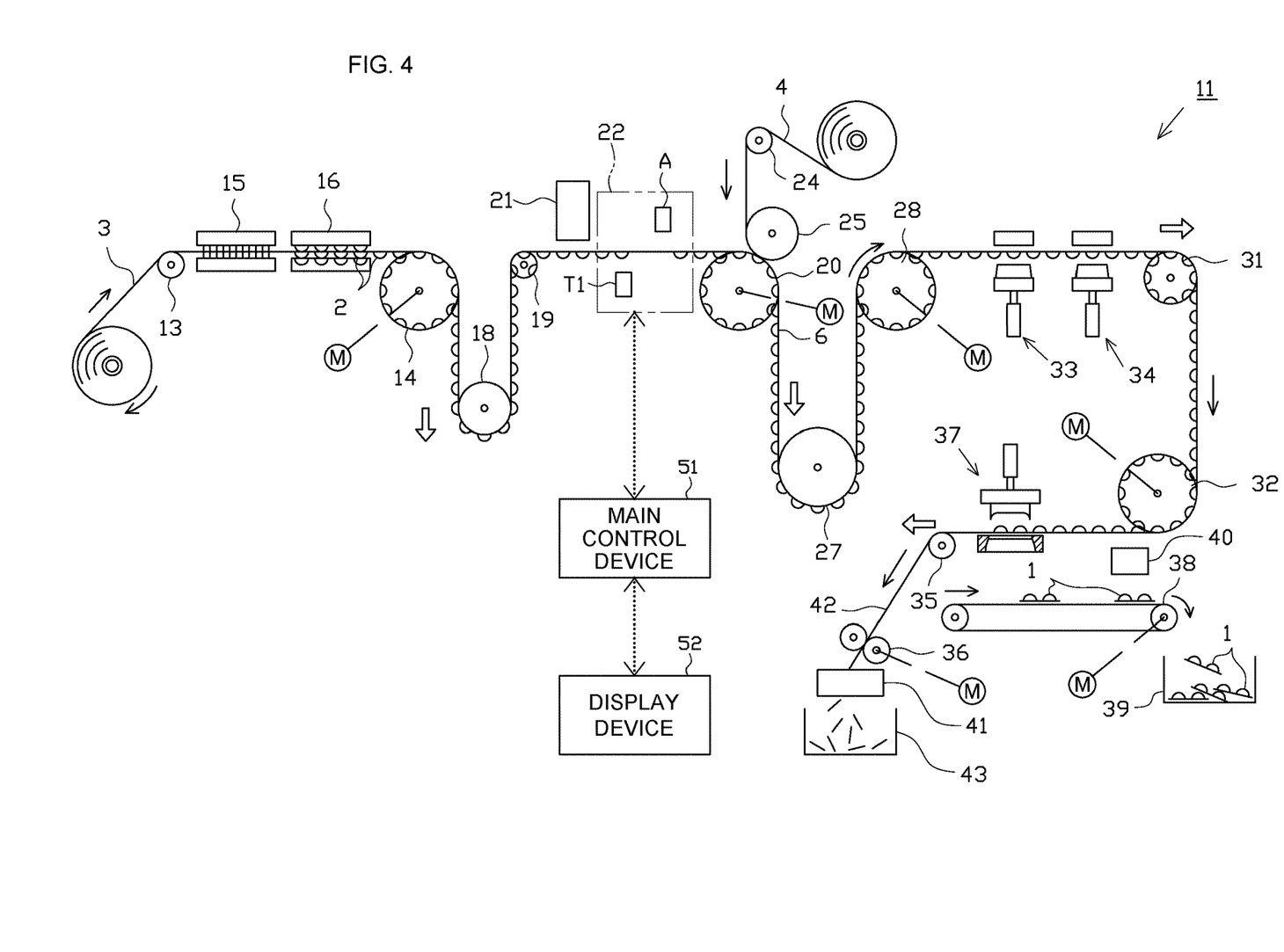
FIG. 4 is a schematic diagram illustrating the schematic configuration of a PTP packaging machine according to one or more embodiments.

A film roll of the strip-shaped container film 3 is wound in a roll form on a most upstream side of the PTP packaging machine 11. A pullout end of the container film 3 wound in the roll form is guided by a guide roll 13. The container film 3 is then laid on an intermittent feed roll 14 provided on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. The container film 3 is heated to be relatively soft by the heating device 15, and the plurality of pocket portions 2 are then formed at predetermined positions of the container film 3 by the pocket portion forming device 16. Formation of the pocket portions 2 is performed during an interval between conveying operations of the container film 3 by the intermittent feed roll 14.

The container film 320 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 to the state of tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is provided along the conveyance path of the container film 3 between the guide roll 19 and the film receiving roll 20. The tablet filling device 21 serves as the filling unit to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation.

A pre-sealing inspection system 22 is provided between the tablet filling device 21 and the film receiving roll 20. The pre-sealing inspection system 22 includes a first inspection device T1 and a second inspection device A that are sequentially provided as inspection devices from the upstream side. The respective inspection devices T1 and A serve to detect the presence or the absence of any defect with regard to the tablet 5 or the container film 3 (sheet portion). The detailed configurations of the respective inspection devices T1 and A will be described later.

A film roll of the strip-shaped cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are fed between the two rolls 20 and 25. The container film 3 and the cover film 4 pass through between the two rolls 20 and 25 in the heated and pressed contact state, so that the cover film 4 is attached to the container film 3 such as to close the respective pocket portions 2. This series of operations manufactures the PTP film 6, such that the tablet 5 is filled in each of the pocket portions 2.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 to the state of tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 to the state of tension by an elastic force and serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form cutting slits at predetermined positions of the PTP film 6. The stamping device 34 serves to stamp marks at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is provided along the conveyance path of the PTP film 6 between the intermittent feed roll 32 and the tension roll 35. The sheet punching device 37 serves to punch out the outer periphery of each portion of the PTP film 6 in the unit of PTP sheet 1.

The PTP sheets 1 punched out by the sheet punching device 37 are conveyed by an extraction conveyor 38 and are once accumulated in a finished product hopper 39. In the case of defective judgment of the PTP sheet 1 by either of the inspection devices T1 and A, a defective signal is sent to a defective sheet discharge mechanism 40 provided along the conveyance path formed by the extraction conveyor 38. The PTP sheet 1 judged as defective is separately discharged by the defective sheet discharge mechanism 40 and is transferred to a non-illustrated defective hopper.

A cutting device 41 is provided on a downstream side of the continuous feed roll 36. An unrequired film portion 42 that is a residual part (scrap part) remaining in a belt-like form after punching by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 19, 20, 28, 31 and 32 described above is arranged such that the roll surface is opposed to the pocket portions 2. The surface of each roll, for example, the surface of the roll 14, has recesses that are formed to place the pocket portions 2 therein. This configuration basically suppresses the pocket portions 2 from being crushed. The feeding operation with the pocket portions 2 placed in the recesses of each roll, for example, in the recesses of the roll 14, achieves the reliable intermittent feed operation and the reliable continuous feed operation.

Figure 5:
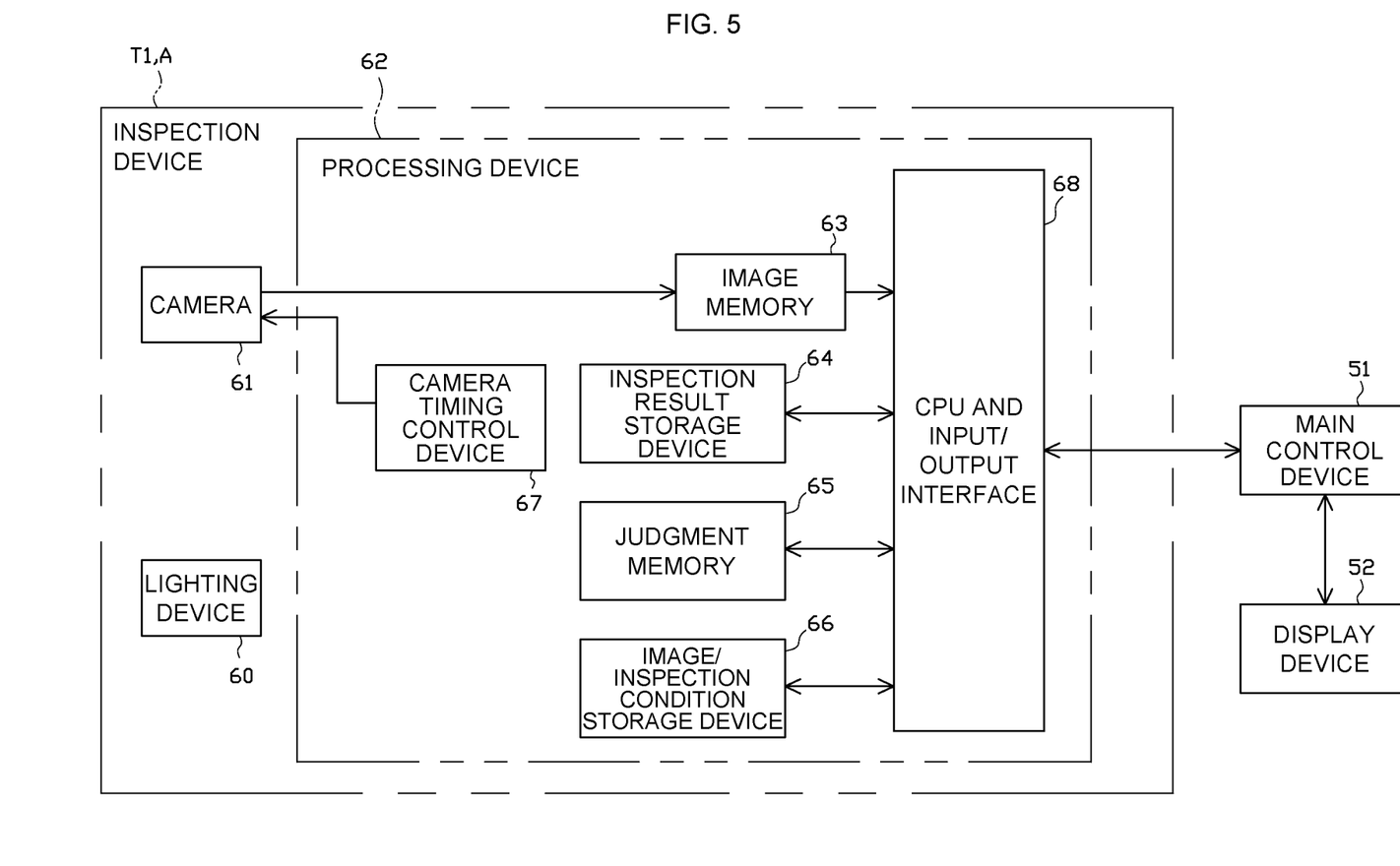
FIG. 5 is a block diagram illustrating the electrical configuration of a first inspection device and a second inspection device according to one or more embodiments.

The following describes the concrete configurations of the first inspection device T1 and the second inspection device A with reference to FIG. 5.

The first inspection device T1 is configured as a transmission-type inspection device to conduct an inspection from a protruded side of the pocket portions 2 of the container film 3 (i.e., from a surface side of the tablets 5) prior to sealing. The first inspection device T1 is configured to detect the presence or the absence of any defect in the tablet 5.

The second inspection device A is configured as an inspection device having both the transmitted light-based inspecting function and reflected light-based inspecting function to conduct an inspection from the protruded portion side and an opening side of the pocket portions 2 of the container film 3 (i.e., from the surface side and a rear face side of the tablets 5) prior to sealing. The second inspection device A is configured to detect the presence or the absence of any defect in the tablet 5 or in the container film 3 (sheet portion).

Each of the inspection devices T1 and A includes a lighting device 60 serving as the irradiator, a camera 61 serving as the imaging unit, and a processing device 62 serving as the quality judgment unit.

The lighting device 60 is configured to irradiate the tablets 5 and an area of the container film 3 that eventually forms the PTP sheet 1 with predetermined light both from the opening side or from the protruded portion side of the pocket portions 2. According to one or more embodiments, the tablets 5 and the area of the container film 3 that eventually forms the PTP sheet 1 correspond to the inspection objects.

The first inspection device T1 includes the lighting device 60 that is placed on the opening side of the pocket portions 2 of the container film 3 to emit near-infrared light. The second inspection device A includes two lighting devices 60 that are respectively placed on the protruded portion side and on the opening side of the pocket portions 2 of the container film 3 to emit visible light.

The camera 61 has sensitivity in a wavelength domain of the light emitted from the lighting device 60.

A CCD camera having sensitivity to near-infrared light is employed as the camera 61 of the first inspection device T1. The first inspection device T1 includes the camera 61 that is placed on the protruded portion side of the pocket portions 2 of the container film 3 to take an image of light transmitted through the container film 3, out of the light (near-infrared light) emitted from the lighting device 60.

A color-discriminable color CCD camera is employed, on the other hand, as the camera 61 of the second inspection device A. The second inspection device A includes two cameras 61 that are placed on the opening side of the pocket portions 2 of the container film 3. One camera 61 is used to take a two-dimensional image of light transmitted through the container film 3, out of the light emitted from the lighting device 60 on the protruded portion side of the pocket portions 2. The other camera 61 (color CCD camera) is used to take a two-dimensional image of light reflected by the tablet 5, out of the light emitted from the lighting device 60 on the opening side of the pocket portions 2.

Primary image data (luminance image data or color image data) obtained by the cameras 61 are input into the processing device 62. The processing device 62 is configured as a computer system including a CPU as the operation unit, a ROM that stores various programs, and a RAM that temporarily stores various data including calculation data and input and output data. The processing device 62 includes an image memory 63, an inspection result storage device 64, a judgment memory 65, an image/inspection condition storage device 66, a camera timing control device 67 and a CPU and input/output interface 68.

The image memory 63 is configured to store, for example, the primary image data taken by the cameras 61. Inspection is performed, based on the data stored in this image memory 63. The data may be subjected to image processing, prior to the inspection. The processing includes, for example, a masking process and shading correction. The shading correction serves to correct a variation in brightness of light caused by the difference in position, since there are technical limitations in uniformly irradiating an entire imaging range of, for example, the container film 3 with light emitted from the lighting device 60. Inspection image data obtained by cutting an inspection object or the like in a rectangular shape from the primary image data as described later, binarized image data obtained by performing a binarization process, masking image data obtained by a masking process and the like are also stored in the image memory 63.

The inspection result storage device 64 is configured to store, for example, data of coordinates and the like with regard to images, data of quality judgment results with regard to inspection objects, and statistical data obtained by processing the preceding data by probability statistics. Such data of quality judgment results and statistical data may be displayed in a display device 52 described later.

The judgment memory 65 is configured to store reference values (for example, threshold values) used for inspection. The reference value is set for each inspection item. The reference values used for inspection include, for example, dimensions of the PTP sheet 1, the pocket portion 2, the tablet 5 and the like, shape and dimensions of each of various windows provided to define respective inspection areas, luminance threshold values involved in the binarization process, reference values involved in area determination, and color reference values involved in color discrimination inspection. The reference values include reference values determined by statistics of inspection measurement results with regard to non-defective products determined in past inspections, for example, reference values used for inspection of tablet area values.

The image/inspection condition storage device 66 is configured by, for example, a hard disk drive. The image/inspection condition storage device 66 is configured to store the details of an inspection that provides defective judgment, the date and time of the defective judgment, image data and inspection conditions used for the inspection.

The camera timing control device 67 is configured to control the imaging timing of the camera 61. The imaging timing is controlled in response to a signal from a non-illustrated encoder provided in the PTP packaging machine 11. An image is taken by the camera 61 whenever a predetermined amount of the container film 3 is fed.

The CPU and input/output interface 68 is configured to perform various controls in the inspection units T1 and A. The CPU and input/output interface 68 is configured to execute various processing programs, for example, an inspection process of the tablet 5 and the container film 3 by using, for example, the storage of the judgment memory 65.

Figure 6:
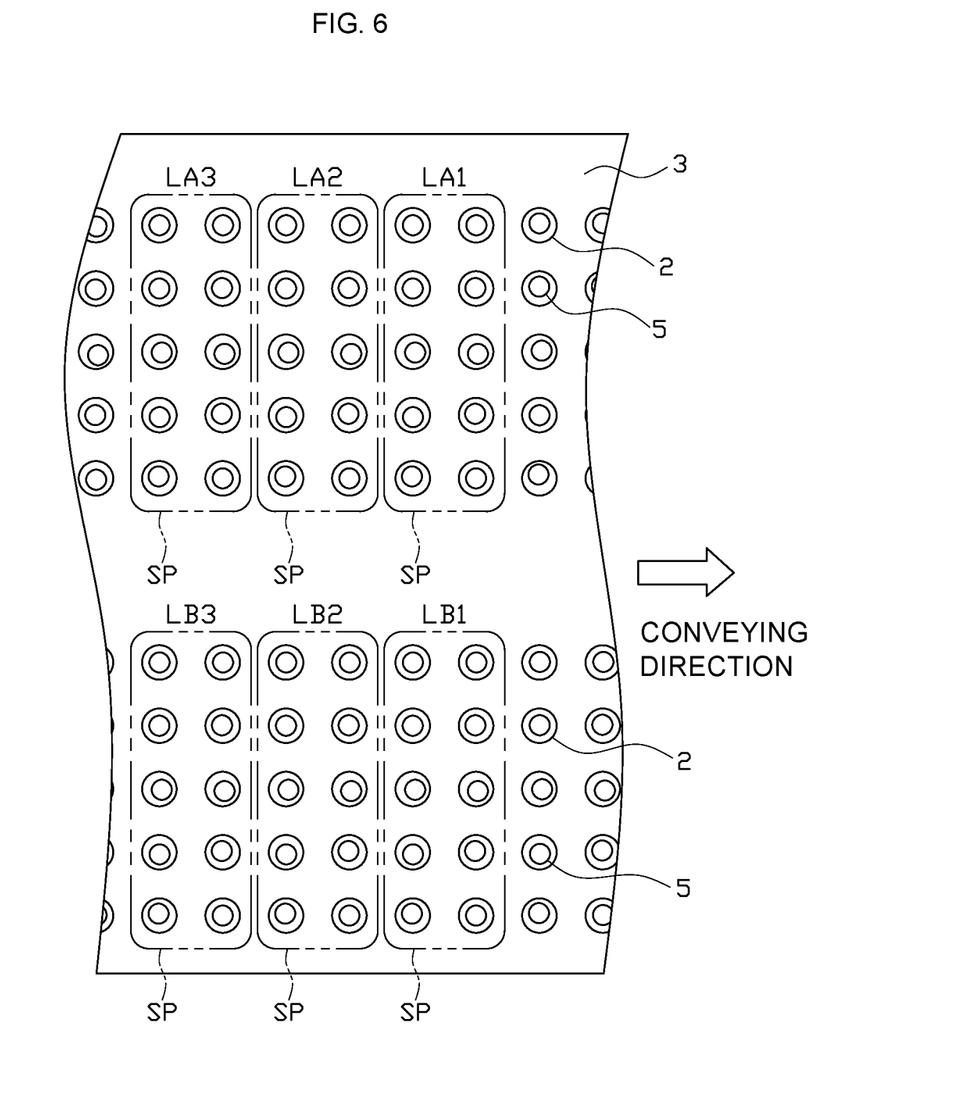
FIG. 6 is a schematic diagram illustrating sequential numbers of sheet portions.

The CPU and input/output interface 68 is also configured to specify respective areas of the container film 3 (sheet portions SP) that eventually form the PTP sheets 1, based on the positions of the pocket portions 2 and the tablets 5 in the primary image data, as shown in FIG. 6. The sheet portion SP has a rectangular shape with rounded corners, like the PTP sheet 1. Sequential numbers LA1, LB1, LA2, LB2, LA3, LB3 and the like are set in a sequence of conveyance to the specified sheet portions SP. The sequential number increases one by one toward the upstream side in the conveyance direction. Sequential numbers are also set to the respective tablets 5.

Each of the inspection devices T1 and A described above obtains predetermined inspection image data and conducts an inspection based on the obtained inspection image data. Each of the inspection devices T1 and A also performs a process of converting part of the obtained inspection image data into attribute information described later.

The following describes a procedure of obtaining inspection image data and an example of an inspection image obtained by using the inspection image data. The inspection devices T1 and A respectively provide different inspection image data and different inspection images. These details with regard to the first inspection device T1 are described first.

Figure 7:
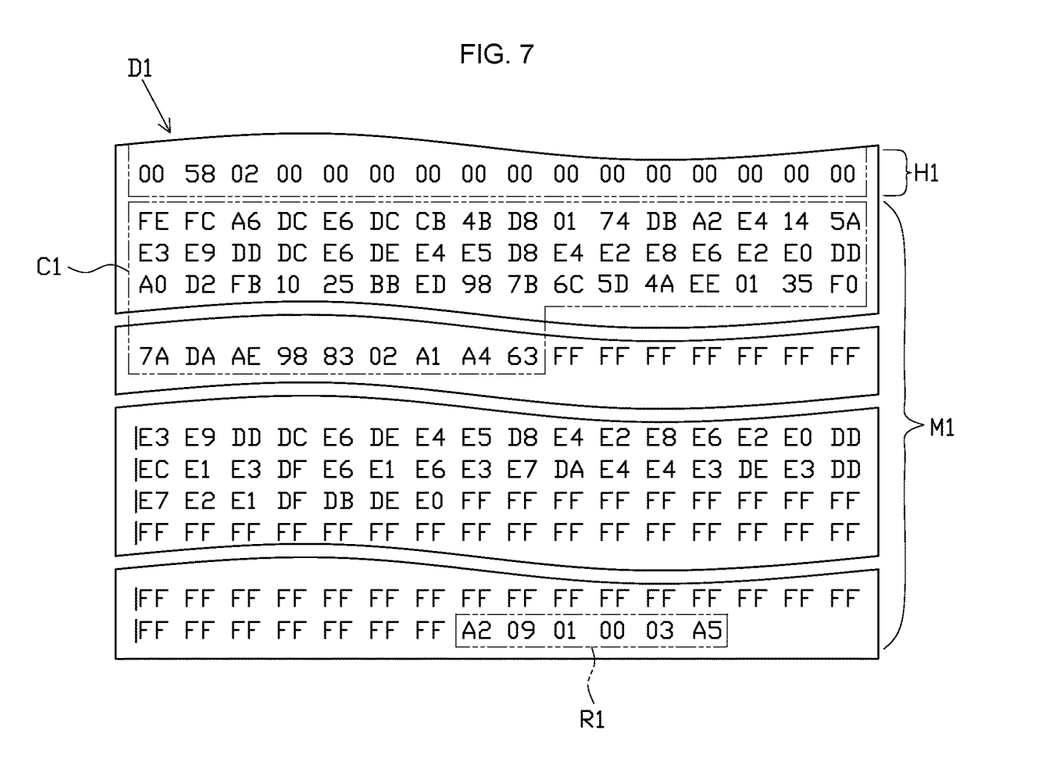
FIG. 7 is a diagram illustrating inspection image data stored in the first inspection device.

In the process of obtaining inspection image data, the first inspection device T1 first uses the processing device 62 to specify the existing regions of the tablets 5 in primary image data. Such specification is performed, based on the positions of the pocket portions 2 and the like obtained from the primary image data. The first inspection device T1 extracts certain data corresponding to at least the tablets 5 and their periphery from the primary image data, so as to obtain inspection image data D1. As shown in FIG. 7, this inspection image data D1 includes a header field H1 provided to store header information and a main field M1 provided subsequent to the header field H1 to store luminance values of respective pixels. In the main field M1, the luminance value of each of the pixels is expressed by, for example, 8 bits. The inspection image data D1 is obtained for each tablet 5, and each of the inspection image data D1 is stored in the form of one file in the image memory 63.

Figure 8:
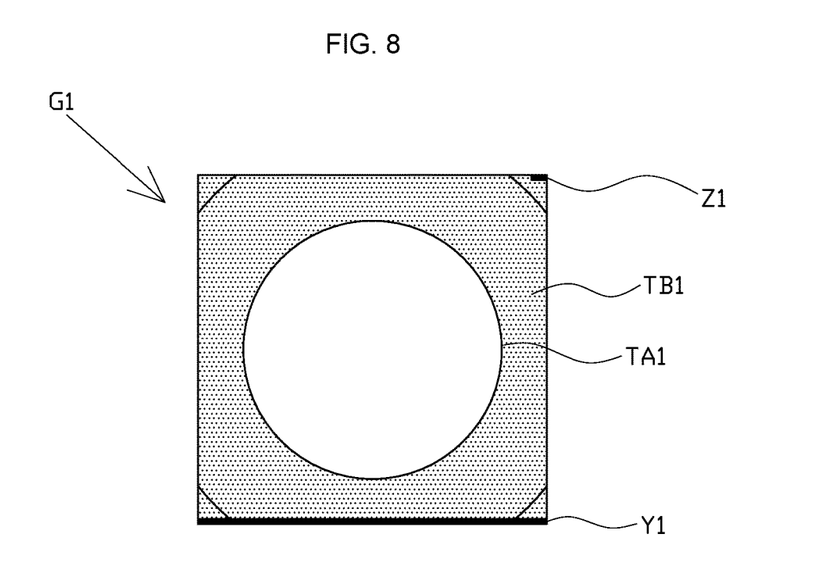
FIG. 8 is a schematic diagram illustrating an inspection image in the first inspection device.

As shown in FIG. 8, an inspection image G1 expressed by the inspection image data D1 has a rectangular shape and includes an inspection target area TA1 corresponding to an area occupied by the tablet 5 and a non-inspection target area TB1 (dot patterned area) corresponding to a remaining area. The inspection target area TA1 denotes an area that is an object of quality judgment by the processing device 62 of the first inspection device T1. The non-inspection target area TB1 denotes an area that is not an object of quality judgment. The inspection image data D1 includes data of respective pixels corresponding to the inspection target area TA1 and data of respective pixels corresponding to the non-inspection target area TB1. Furthermore, the non-inspection target area TB1 is provided at edges of the inspection image G1 throughout the height direction and the width direction of the inspection image G1.

The following describes a procedure of obtaining inspection image data and an example of an inspection image obtained by using the inspection image data with regard to the second inspection device A.

Figure 9:
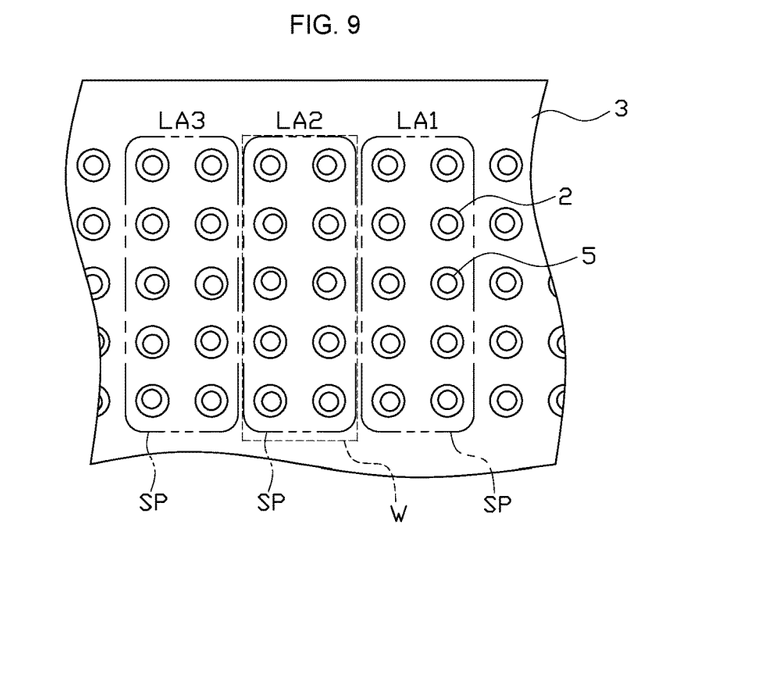
FIG. 9 is a schematic diagram illustrating a method of obtaining inspection image data in the second inspection device.

In the process of obtaining inspection image data, the second inspection device A first uses the processing device 62 to specify areas of the container film 3 (sheet portions SP) that eventually form the PTP sheets 1 as shown in FIG. 9. Such specification is performed, based on the positions of the pocket portions 2 and the tablets 5 in the primary image data. The position of the sheet portion SP is then corrected in the primary image data, such that the sheet portion SP is placed at a predetermined position in a window W set in advance. A correction amount of position misalignment of the sheet portion SP is provided as position follow-up information of the sheet portion SP described later. The second inspection device A then extracts data corresponding to the portion placed in the window W from the primary image data, so as to obtain inspection image data D2.

Figure 10:
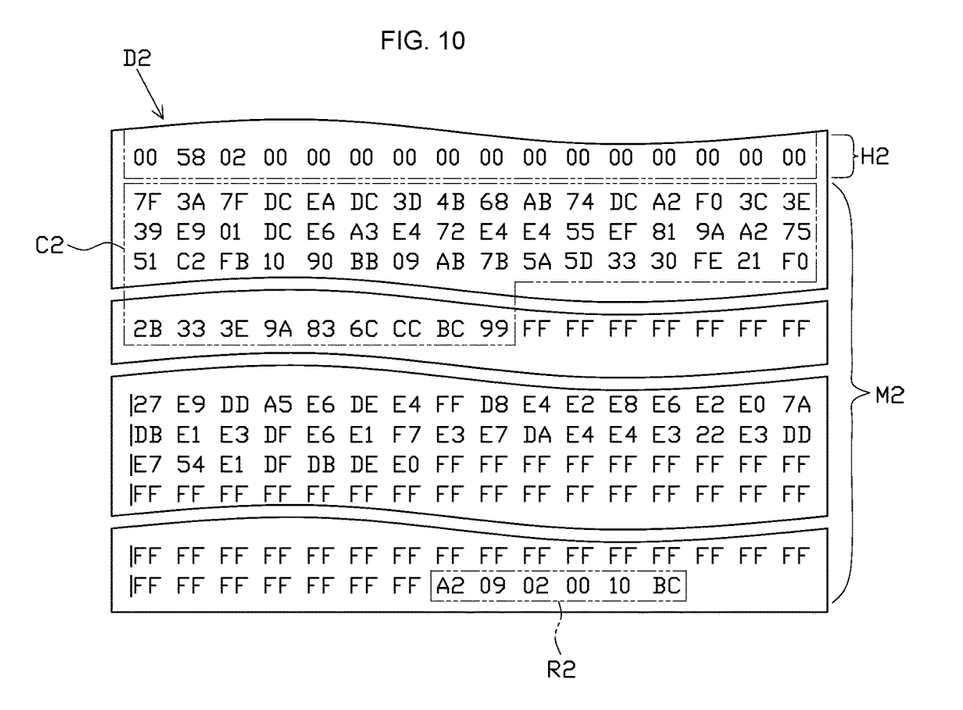
FIG. 10 is a diagram illustrating inspection image data stored in the second inspection device.

As shown in FIG. 10, the inspection image data D2 includes a header field H2 provided to store header information and a main field M2 provided subsequent to the header field H2 to store values of RGB components in respective pixels. In the main field M2, the value of each component of the RGB components is expressed by, for example, 8 bits. The inspection image data D2 is obtained for each sheet portion SP, and each of the inspection image data D2 is stored in the form of one file in the image memory 63.

Figure 11:
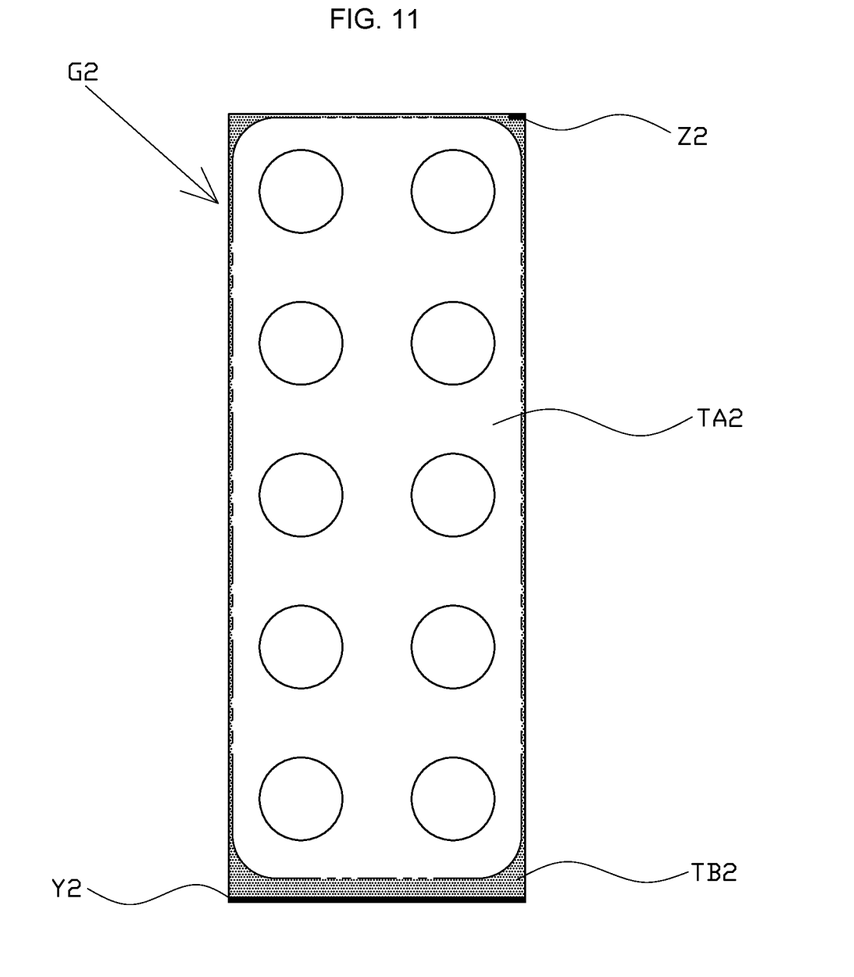
FIG. 11 is a schematic diagram illustrating an inspection image in the second inspection device.

As shown in FIG. 11, an inspection image G2 expressed by the inspection image data D2 has a rectangular shape and includes an inspection target area TA2 corresponding to an area occupied by the sheet portion SP and a non-inspection target area TB2 (dot patterned area) corresponding to a remaining area. The inspection target area TA2 denotes an area that is an object of quality judgment by the processing device 62 of the second inspection device A. The non-inspection target area TB2 denotes an area that is not an object of quality judgment. The inspection image data D2 includes data of respective pixels corresponding to the inspection target area TA2 and data of respective pixels corresponding to the non-inspection target area TB2.

Furthermore, the non-inspection target area TB2 is provided at four corners of the inspection image G2 to be located outside of respective rounded corners of the inspection target area TA2. The non-inspection target area TB2 is also provided at edges of the inspection image G2 throughout the height direction and the width direction of the inspection image G2.

Additionally, the processing device 62 of each of the inspection devices T1 and A serves to convert at least part of data of respective pixels in the inspection image data D1 or D2 corresponding to the non-inspection target area TB1 or TB2, into predetermined attribute information. Accordingly, the processing devices 62 of the respective inspection devices T1 and A respectively serve as the attribute information adding unit. According to one or more embodiments, conversion into the attribute information is performed subsequent to an inspection process described later. According to a modification, conversion into the attribute information may be performed prior to the inspection process.

The following first describes a process of conversion into attribute information in the first inspection device T1. Information regarding an address of a predetermined storage field R1 (shown in FIG. 7) in the inspection image data D1 is set in advance in the first inspection device T1. This storage field R1 is an area where the attribute information is written. According to one or more embodiments, the storage field R1 stores data of pixels corresponding to an attribute information zone Z1 of the non-inspection target area TB1 located at an upper right edge of the inspection image G1 (as shown in FIG. 8). The processing device 62 of the first inspection device T1 converts data of a predetermined number of pixels in the storage field R1 into attribute information.

The following subsequently describes a process of conversion into attribute information in the second inspection device A. Information regarding an address of a predetermined storage field R2 (shown in FIG. 10) in the inspection image data D2 is set in advance in the second inspection device A. This storage field R2 is an area where the attribute information is written. According to one or more embodiments, the storage field R2 stores data of pixels corresponding to an attribute information zone Z2 of the non-inspection target area TB2 located at an upper right edge of the inspection image G2 and outside of a rounded corner of the inspection target area TA2 (as shown in FIG. 11). The processing device 62 of the second inspection device A converts data of a predetermined number of pixels in the storage field R2 into attribute information. The number of data to be converted into attribute information may be changed appropriately.

The attribute information includes, for example, the type of an inspection conducted by each of the inspection devices T1 and A, the date and time of the inspection, the sequential number of the sheet portion SP (PTP sheet 1) or the sequential numbers of the tablets 5, information indicating color or monochromatic of the inspection image data D1 or D2, information regarding results of the inspection, information regarding various corrections, such as position follow-up information of the sheet portion SP and a correction amount of brightness, position information of the tablets 5 in the sheet portion SP, information regarding control of the camera 61 (for example, a gain), information required for reinspection (for example, a luminance reference value used in a binarization process), and information regarding types of the tablets 5, the container film 3 and the like. According to one or more embodiments, the type of an inspection, the date and time of the inspection and the sequential number of the sheet portion SP or the sequential numbers of the tablets 5 are stored as the attribute information.

Furthermore, the processing device 62 of each of the inspection devices T1 and A converts at least part of data of respective pixels corresponding to the non-inspection target area TB1 or TB2, into check information that is used to check for an error in data of respective pixels in the inspection image data D1 or D2. Accordingly, the processing devices 62 of the respective inspection devices T1 and A respectively serve as the check information adding units. According to one or more embodiments, conversion into the check information is performed subsequent to the inspection process described later. According to a modification, conversion into the check information may be performed prior to the inspection process.

The following describes conversion into the check information. Information regarding addresses of predetermined check information storage fields C1 and C2 (shown in FIG. 7 and FIG. 10) in the inspection image data D1 and D2 are set in advance in the respective inspection devices T1 and A. These check information storage fields C1 and C2 are areas where the check information is written. The check information storage fields C1 and C2 respectively store data of pixels corresponding to check areas Y1 and Y2 (shown in FIG. 8 and FIG. 11). According to one or more embodiments, the check areas Y1 and Y2 respectively denote partial areas of the non-inspection target areas TB1 and TB2 that are located at lowermost edges of the inspection images G1 and G2 throughout the width direction of the inspection images G1 and G2 and are areas corresponding to one line (row) of pixels. The processing devices 62 of the respective inspection devices T1 and A respectively convert data of one line of pixels in the respective check information storage fields C1 and C2 into the check information.

The check information denotes information used to perform check sum. According to one or more embodiments, the check information denotes last two digits of a total value of data of pixels (luminance values) in each column, except data of the check information storage field C1 or C2. For example, data of a certain pixel in the check information storage field C1 denotes last two digits of a total value of data of the other pixels included in the same column as the certain pixel. The check information is used to check the data of the respective pixels in the unit of each column. The check information may be, for example, information indicating that the total value described above is an even number or an odd number.

Each of the inspection image data D1 or D2 after completion of the conversion into the attribute information or into the check information is stored in the form of one file in the image memory 63. Accordingly, the inspection image data D1 or D2, the attribute information and the check information are collectively stored in the form of one file in the image memory.

Furthermore, each of the inspection devices T1 and A conducts an inspection of the tablets 5 and the container film 3, based on the inspection image data D1 or D2. The inspection image data D1 or D2 used for the inspection is the data prior to conversion into the attribute information or into the check information according to one or more embodiments but may be, however, data after conversion into the attribute information or into the check information.

The processing device 62 of each of the inspection devices T1 and A performs, for example, a masking process of the non-inspection target area TB1 or TB2, a binarization process of the inspection target area TA1 or TA2 remaining after the masking process, a mass processing of binarized image data obtained by the binarization process, and a defect judgment process of determining the presence or the absence of a defective part, based on the number, the area and the position of a mass part obtained by the mass processing, as the inspection process for the tablets 5 and the container film 3. When there is any defective part, the processing device 62 of each of the inspection devices T1 and A determines that the PTP sheet 1 corresponding to the inspection object as defective. When there is no defective part, on the other hand, each of the inspection devices T1 and A determines that the PTP sheet 1 corresponding to the inspection object as non-defective.

The PTP packaging machine 11 also includes a main control device 51 and a display device 52 provided with a display and the like, in addition to the respective devices described above.

The main control device 51 is configured by a computer system like the processing device 62 to drive and control various devices constituting the PTP packaging machine 11. The main control device 51 outputs control signals to the various devices included in the PTP packaging machine 11, based on set data that are set in advance in a ROM or the like of the main control device 51, so as to drive and control the various devices.

The main control device 51 is electrically connected with the respective inspection devices T1 and A to receive and send various information from and to the respective inspection devices T1 and A. The main control device 51 is configured to output a defective signal to the defective sheet discharge mechanism 40 and thereby cause the defective sheet discharge mechanism 40 to discharge the PTP sheet 1 determined as defective, based on the results of an inspection performed by each of the inspection devices T1 and A.

The main control device 51 is also configured to receive the inspection image data D1 and D2 accompanied with the stored attribute information and check information from the respective inspection devices T1 and A. The main control device 51 is configured to receive information regarding a predetermined address that is set in advance, from the received inspection image data D1 or D2 and thereby extract data regarding the attribute information. The main control device 51 is further configured to display the inspection images G1 and G2 and the attribute information in the display device 52. A general image processing software is used to display the inspection images G1 and G2.

In the process of displaying the inspection images G1 and G2 and the like, the main control device 51 is further configured to check for an error in the data of the respective pixels by using the check information and to display information regarding the presence or the absence of any error along with the inspection images G1 and G2 and the like in the display device 52.

As described in detail, the configuration of one or more embodiments enables the attribute information to be included in the inspection image data D1 or D2, so that the inspection image data D1 or D2 and the attribute information are collectively provided in the form of one file. This configuration simplifies data management and reduces the processing load.

The non-inspection target areas TB1 and TB2 are not the objects of the quality judgment by the processing device 62. Accordingly, conversion of data of pixels corresponding to this non-inspection target area TB1 or TB2 into attribute information or into check information neither affects an inspection nor causes mismatching of the results of the inspection with the inspection image data D1 or D2. Furthermore, the object of conversion is not header information but data of respective pixels or more specifically main body data of the inspection image data D1 or D2 (data of the main field M1 or M2). This configuration enables the inspection image data D1 or D2 to be processed by using a general image processing software.

The second inspection device A configured to conduct an inspection for the sheet portion SP takes advantage of formation of a relatively wide non-inspection target area TB2 at the four corners of the inspection image G2 to be located outside of respective corners of the inspection target area TA2 to convert data of pixels corresponding to this non-inspection target area TB2 into attribute information. This configuration reliably provides a storage area for storing the attribute information at a fixed position in the inspection image data D2. Certain pixel data having a predetermined address corresponding to the four corners of the inspection image G2 (data of the storage field R2) can thus be specified as the area where attribute information is written. This configuration enables the area where attribute information is written to be set without specifically taking account of the range occupied by the inspection target area TA2. The main control device 51 reads the information of the predetermined address that is set in advance, so as to read the attribute information from the preset certain area where the attribute information is written. This configuration simplifies, for example, processes involved in writing and reading the attribute information and thereby effectively reduces the processing load.

Additionally, using the check information further assures the reliability of information with regard to the inspection image D1 or D2. Especially, according to one or more embodiments, data of respective pixels included in one line corresponding to the non-inspection target area TB1 or TB2 is converted into check information that is used to check for an error of data in the same columns as the respective pixels. This configuration enables data of respective pixels to be checked in the unit of each line or in the unit of each column. This configuration further assures the reliability of information with regard to the inspection image data and further enhances the reliability of the inspection.

The present invention is not limited to the description of the above embodiments but may also be implemented, for example, by configurations described below. The present invention may further be implemented by other applications and other modifications that are not specifically described below.

(a) According to one or more embodiments, the technical concept of the present invention is applied to the first inspection device T1 and the second inspection device A that respectively conduct an inspection prior to mounting of the cover film 4 to the container film 3. According to a modification of one or more embodiments, however, the technical concept of the present invention may be applied to an inspection device that conducts an inspection subsequent to mounting of the cover film 4 to the container film 3. According to another modification of one or more embodiments, the technical concept of the present invention may be applied to an inspection device that conducts an inspection of the PTP sheet 1 as the finished product. According to another modification of one or more embodiments, the technical concept of the present invention may be applied to an inspection device that conducts an inspection of the tablets 5 before being filled into the pocket portions 2.

(b) The attribute information and the check information may be configured to be converted from data of pixels corresponding to the non-inspection target area TB1 or TB2 in the inspection image data D1 or D2. Accordingly, data of pixels corresponding to a different part of the non-inspection target area TB1 or TB2 other than the non-inspection target area TB1 or TB2 located at the upper right edge of the inspection image G1 or G2 and the non-inspection target area TB1 or TB2 located at the lowermost edge described in the above embodiments may be converted into the attribute information or into the check information. For example, data of pixels corresponding to the non-inspection target area TB1 or TB2 located at a lower left edge of the inspection image G1 or G2 may be converted into the attribute information.

(c) The embodiments described above are configured to convert data of respective pixels included in one line corresponding to the non-inspection target area TB1 or TB2 throughout the width direction, into check information that is used to check for an error in data of the other pixels located in the same columns as the respective pixels. With regard to the non-inspection target area TB1 or TB2 throughout the height direction, a modification may be configured to convert data of respective pixels included in one column corresponding to the non-inspection target area TB1 or TB2, into check information that is used to check for an error in data of the other pixels located in the same lines as the respective pixels. This modified configuration enables data of respective pixels to be checked in the unit of each line. Like the above embodiments, this modified configuration further assures the reliability of information with regard to the inspection image data D1 or D2 and further enhances the reliability of the inspection.

Data of respective pixels corresponding to one line and data of respective pixels corresponding to one column may respectively be converted into the check information. This modified configuration enables a pixel having a data error to be identified. This modified configuration accordingly enables an inspection to be conducted by using data excluding the data of this identified pixel (i.e., an inspection with exclusion of the effect of the error) and the data error of this identified pixel to be corrected by using data of pixels located in the periphery of this identified pixel.

Furthermore, it is not essential to convert data of respective pixels corresponding to one column or corresponding to one line into the check information. For example, some of data of respective pixels corresponding to the non-inspection target area TB1 or TB2 may be converted into the check information. For example, data of one certain pixel may be converted into data based on a total value of data of the other pixels.

(d) According to the embodiments described above, the processing device 62 includes the inspection result storage device 64 configured to store, for example, data indicating the results of quality judgment of an inspection object and the image/inspection condition storage device 66 configured to store the details of an inspection that provides defective judgment and the date and time of the defective judgment. Such information stored in these storage devices 64 and 66 may be written as the attribute information into the inspection image data D1 and D2. This modification allows for omission of these storage devices 64 and 66. This modification accordingly reduces the cost, along with further simplifying the data management and reducing the processing load.

(e) The above embodiments concretely describes the configuration for the tablet 5 as the content. The content may, however, be a capsule (for example, a medical product or a nutrition product)

(f) According to the above embodiments, the container film 3 is made of a thermoplastic resin material such as PP or PVC, and the cover film 4 is formed by using aluminum foil or the like as the base material. The materials of the respective films 3 and 4 are, however, not limited to these materials but may be other materials.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet (content), 11 . . . PTP packaging machine, 60 . . . lighting device (irradiator), 61 . . . camera (imaging unit), 62 . . . processing device (quality judgment unit, attribute information adding unit, check information adding unit), T1 . . . first inspection device (inspection device), A . . . second inspection device (inspection device), D1, D2 . . . inspection image data, G1, G2 . . . inspection images, TA1, TA2 . . . inspection target areas, TB1, TB2 . . . non-inspection target areas

The invention claimed is:

1. An inspection device for inspecting an inspection object of a Press Through-Pack (PTP) sheet comprising a pocket portion formed in a container film to house a content, and a cover film mounted to the container film to close the pocket portion, or a portion of a PTP film forming the PTP sheet, the inspection device comprising:
  an irradiator that irradiates the inspection object with a predetermined light;
  an imaging device that takes an inspection image of the irradiated inspection object and a peripheral portion of the inspection object; and
  a processor that:
    determines whether the inspection object is defective or non-defective based on inspection image data of the inspection object taken from the inspection image, wherein the inspection image data includes data of respective pixels corresponding to an inspection target area subjected to the defective/non-defective determination, and data of respective pixels corresponding to a non-inspection target area that excludes the inspection target area;
    converts part of the data corresponding to the non-inspection target area into attribute information that relates to an inspection; and
    converts part of the data corresponding to the non-inspection target area into check information used to check for an error in the inspection image data.

2. The inspection device according to claim 1, wherein the inspection image has a rectangular shape and the non-inspection target area of the inspection image is located at an edge of the inspection image and extends throughout at least one of a height direction and a width direction of the inspection image, and the processor further performs at least one of:
　　converting data of every pixel included in a column that corresponds to the non-inspection target area into a check information used to check for an error in data of every pixel located in a same row as each of the pixels of the column when the non-inspection target area extends throughout the height direction, and
　　converting data of every pixel included in a row that corresponds to the non-inspection target area into a check information used to check for an error in data of every pixel located in a same column as each of the pixels of the row when the non-inspection target area extends throughout the width direction.

3. An inspection device for inspecting an inspection object of a Press-Through-Pack (PTP) sheet comprising a pocket portion formed in a container film to house a content, and a cover film mounted to the container film to close the pocket portion, or a portion of a PTP film forming the PTP sheet, the inspection device comprising:
　　an irradiator that irradiates the inspection object with a predetermined light;
　　an imaging device that takes an inspection image of the irradiated inspection object and a peripheral portion of the inspection object; and
　　a processor that:
　　　　specifies the inspection object, based on positions of the pocket portion and the content, out of the inspection image;
　　　　determines whether the inspection object is defective or non-defective based on inspection image data of the inspection object specified out of the inspection image, wherein the inspection image data includes data of respective pixels corresponding to an inspection target area subjected to the defective/non-defective determination, and data of respective pixels corresponding to a non-inspection target area that excludes the inspection target area; and
　　　　converts part of the data corresponding to the non-inspection target area into attribute information that relates to an inspection.

4. The inspection device according to claim 1, wherein
the inspection image has a rectangular shape,
the inspection target area has a rectangular shape with rounded corners,
the non-inspection target area is disposed at the four corners of the inspection image and located outside of the rounded corners of the inspection target area, and
the processor further converts part of the data corresponding to the non-inspection target area located at the four corners of the inspection image into the attribute information.

5. The inspection device according to claim 3, wherein
the inspection image has a rectangular shape,
the inspection target area has a rectangular shape with rounded corners,
the non-inspection target area is disposed at the four corners of the inspection image and located outside of the rounded corners of the inspection target area, and
the processor further converts part of the data corresponding to the non-inspection target area located at the four corners of the inspection image, into the attribute information.

6. A PTP packaging machine comprising:
the inspection device according to claim 1.
7. A PTP packaging machine comprising:
the inspection device according to claim 2.
8. A PTP packaging machine comprising:
the inspection device according to claim 3.
9. A PTP packaging machine comprising:
the inspection device according to claim 4.
10. A PTP packaging machine comprising:
the inspection device according to claim 5.

* * * * *